Figure 2:
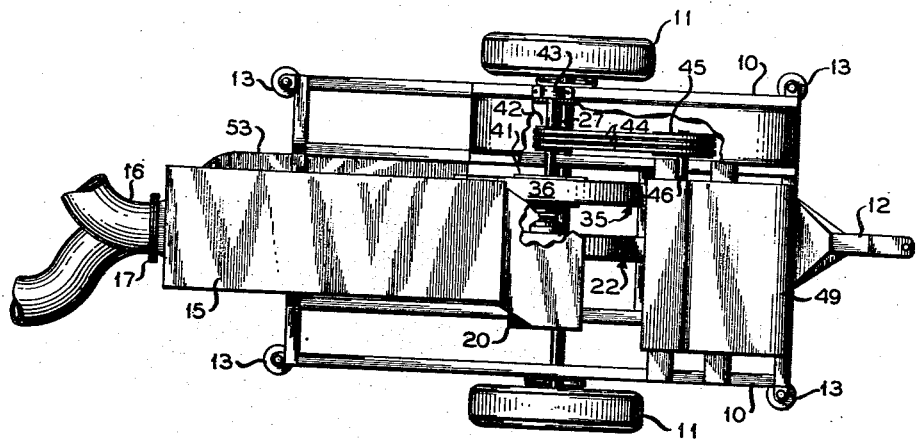

Aug. 10, 1954

C. A. BALDWIN 2,686,084

PORTABLE PNEUMATIC CONVEYER

Filed March 27, 1950

2 Sheets-Sheet 1

*INVENTOR.*
C. A. BALDWIN
BY

*A. Yates Dowell*
ATTORNEY

Aug. 10, 1954

C. A. BALDWIN 2,686,084

PORTABLE PNEUMATIC CONVEYER

Filed March 27, 1950

2 Sheets-Sheet 2

INVENTOR.
C. A. BALDWIN
BY
A. Yates Dowell
ATTORNEY

Patented Aug. 10, 1954

2,686,084

UNITED STATES PATENT OFFICE 2,686,084

PORTABLE PNEUMATIC CONVEYER

Charles Albert Baldwin, Streator, Ill.

Application March 27, 1950, Serial No. 152,239

4 Claims. (Cl. 302—23)

This invention relates to material handling and more particularly to a convenient, portable pneumatic means for conveying granular or fluent material from one location to another without in any way changing the character of the material.

Heretofore, numerous types of pneumatic conveyors have been proposed but in many of these the material to be conveyed either passes through the fan which creates the air blast or passes through a rotary valve disposed in the outlet of the hopper and in either case there is likelihood of damage to the material or, in the event foreign objects are included therewith, clogging and stopping of the apparatus is a frequent occurrence.

Such clogging and stopping also frequently damages the parts to such an extent that extensive repairs are necessary which renders the apparatus useless for a considerable period of time.

Briefly stated, the invention disclosed in this application comprises a power means such as a small internal combustion engine for driving a pair of fans, one of which creates a partial vacuum in a hopper. A material inlet conduit is connected to the upper portion of the hopper and material is drawn into the hopper and falls by gravity to the lower portion thereof.

The discharge adjacent the bottom of the hopper opens into a chamber in which a partial vacuum is induced by the passage of the air blast from the discharge of the first fan and this vacuum is augmented by induction from the discharge blast of the second fan, the inlet of which is open to the atmosphere. It is therefore apparent that the material flowing into the hopper traverses an unobstructed path through and from the hopper into the chamber mentioned above, the combined air blasts from the two fans projecting the material through a discharge conduit to any desired location.

It will also be noted that none of the material conveyed by the apparatus passes through the fans and consequently the material arrives at its destination in substantially its original condition.

For convenience, the entire apparatus may be mounted on a small trailer to be towed by another vehicle and set up for operation in any desired location.

It is therefore an object of the invention to provide a portable pneumatic conveyor in which granular or fluent material may be conveyed from one point to another and in which the material remains out of contact with any moving parts thus preserving the original condition of the material and preventing damage to the apparatus due to the presence of foreign objects therein.

It is a further object of the invention to provide a portable self-contained pneumatic conveyor incorporating power means and vacuum and air blast producing means driven thereby in which the vacuum producing means moves the material from a source to a hopper and in which the combined air blast and discharge from the vacuum producing means results in inducing a vacuum adjacent the outlet of the hopper whereby the material enters the discharge conduit and is projected therethrough.

It is a further object of the invention to provide a portable pneumatic conveying apparatus for fluent or granular material in which a vacuum is directly applied to a suction conduit to move the material from a source to a hopper and in which an induced vacuum is applied to the outlet of the hopper to assure movement of material therethrough.

Figure 1:
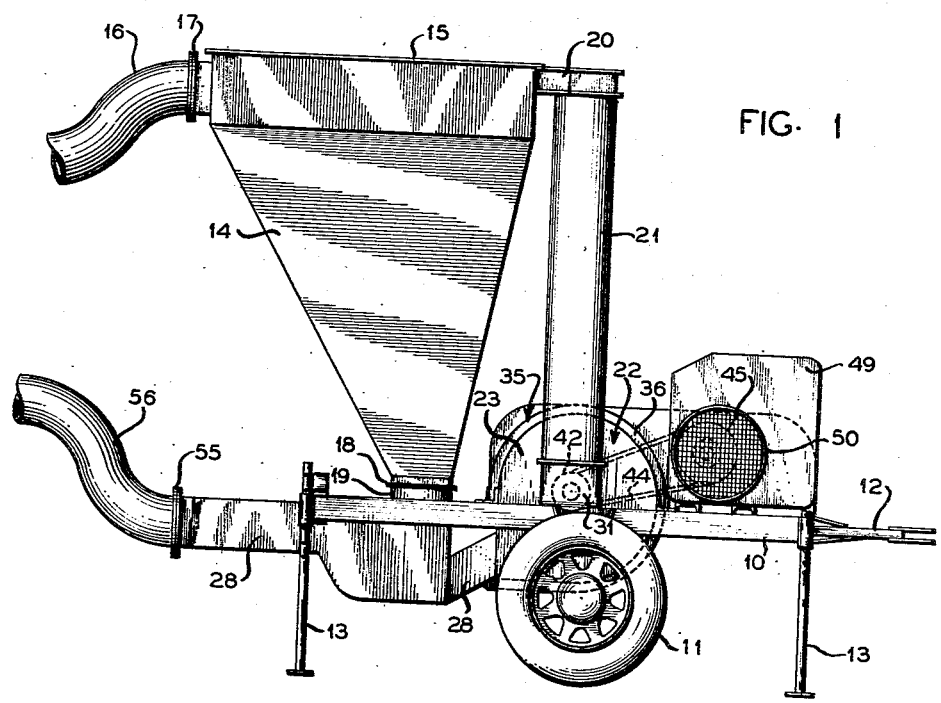
Figure 3:
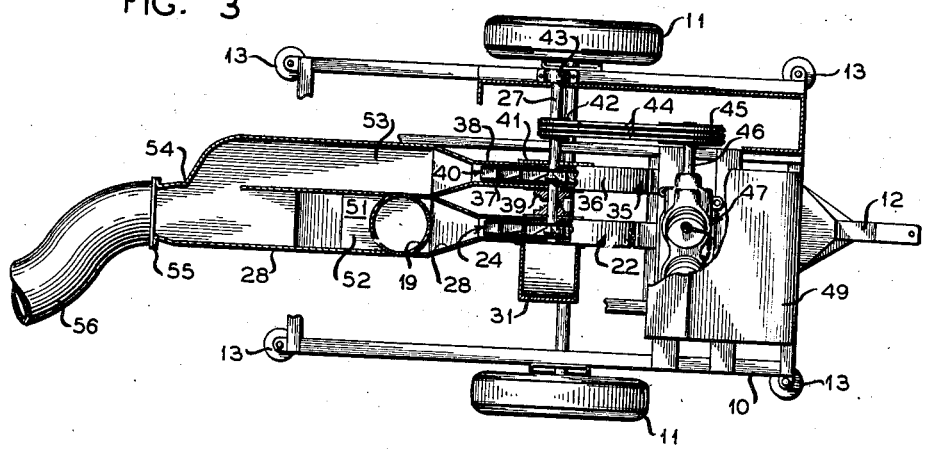
Figure 4:
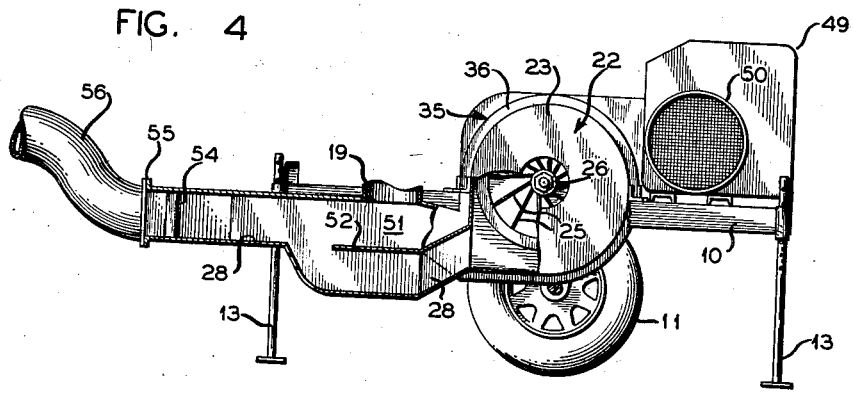
Figure 5:
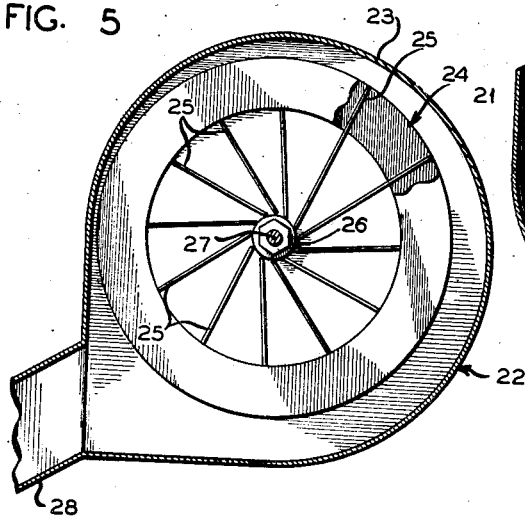

Further objects and advantages of the present invention will be apparent from the following description taken in conjunction with the accompanying drawings, wherein:

Fig. 1 is a side elevational view showing the pneumatic conveying apparatus of this invention;

Fig. 2, a top plan view of the apparatus shown in Fig. 1 with parts broken away for greater clarity;

Fig. 3, a top plan view similar to Fig. 2 but with parts in section to show the particular arrangement of the air blast discharge ducts;

Fig. 4, a fragmentary side elevational view similar to Fig. 1 but with parts in section to show the internal structure of the apparatus;

Fig. 5, a vertical sectional view of one of the blowers; and

Figure 6:
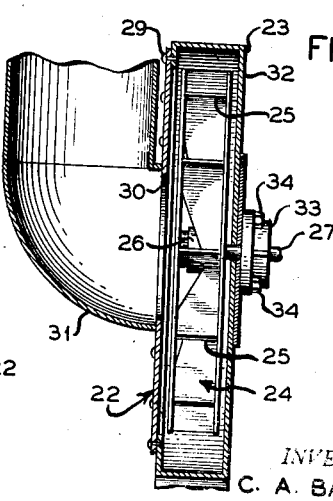

Fig. 6, a sectional view of one of the blowers taken at right angles to Fig. 5.

With continued reference to the drawings there is shown a frame or chassis 10 having a pair of ground engaging wheels 11 mounted thereon, a draft bar 12 being attached to the frame and adapted to engage a trailer hitch or the like of any desired towing vehicle. Since the apparatus disclosed is of relatively light weight, only a single pair of ground engaging wheels is necessary and in order to properly support the device when in use and when disengaged from the towing vehicle, an adjustable ground engaging foot 13 is provided at each corner of the frame 10, each of which may be lowered to firmly engage the ground and support the apparatus in a stable and level position.

Mounted upon the frame 10 adjacent one end thereof is a material receiving hopper 14 having a generally flat funnel shape, the top of the hopper being closed and rendered substantially airtight by a lid 15, there being an inlet conduit 16 attached to the hopper by flange coupling 17 adjacent the top thereof. The lower end of the hopper 14 is provided with a flange coupling 18 which connects the same to an outlet conduit 19. Also attached to the hopper 14 and communicating with the interior thereof adjacent the top but substantially opposite to the inlet conduit 16 is a vacuum duct 20 attached to a downwardly extending pipe 21 which terminates at the inlet to a vacuum producing fan or blower 22 mounted on the frame 10.

As best shown in Figs. 5 and 6, the blower 22 comprises a casing 23 in which is disposed a fan 24 having radially disposed blades 25 and a central hub 26 secured to a drive shaft 27. The casing 23 is provided with a discharge outlet duct 28 arranged eccentrically of the fan 24.

The casing 23 is provided with a side wall 29 having a centrally disposed opening 30 which permits entrance of air to the casing. In order to permit convenient attachment of the blower 22 to the downwardly extending vacuum pipe 21, an elbow 31 is attached to the side wall 29 and in communication with the opening 30, the pipe 21 being secured to the elbow 31. The casing 23 is likewise provided with an opposite end wall 32 having a centrally located aperture therein through which the shaft 27 extends, there being provided a support bearing 33 in which the shaft 27 is journaled, the bearing 33 being secured to the side wall 32 by screw-threaded fastening means or the like 34.

A second blower 35 is mounted on the frame 10 axially of the blower 22, the blower 35 having an outer casing 36 and side walls 37 and 38. The shaft 27 extends through the side walls 37 and 38 and is journaled in a bearing 39 mounted on the side wall 37. A blower fan 40 disposed in the casing 36 is mounted on the shaft 27 for rotation therewith. The side wall 38 is provided with a central opening covered by a grille or screen 41 which serves to permit the entrance of filtered air to the interior of the blower casing. The shaft 27 has mounted thereon a pulley 42 and outwardly thereof is journaled in a bearing 43 mounted on the frame 10.

The pulley 42 is engaged by a plurality of V-belts 44 or other equivalent driving means which in turn engage a pulley 45 mounted on the power output shaft 46 of an internal combustion engine 47 also mounted on the frame 10. Obviously any other desired motive power may be substituted for the internal combustion engine 47 with no change in the operation of the apparatus. In order to present a pleasing appearance and to prevent access of rain or damage to the engine 47, there may be provided a protective hood or covering 49 mounted over the engine and secured to the frame 10, the hood 49 being provided with a screened opening 50 in one wall thereof to provide for admission of cooling air.

The outlet 19 of hopper 14 communicates with a chamber 51 having a bottom wall 52 forming a part of the discharge duct 28 of suction blower 22. The bottom wall 52 of chamber 51 terminates to one side of the outlet 19 and obviously air flowing through discharge duct 28 will flow past the end of wall 52 and will thus induce a partial vacuum in chamber 51.

Blower 35 is provided with a discharge duct 53 which communicates with the discharge duct 28 at 54, the air blast flowing therethrough mingling with the air blast passing through duct 28 to further increase the vacuum induced in chamber 51. Ducts 28 and 53 outwardly of their point of junction are connected by a flange coupling 55 to a material discharge conduit 56. This arrangement results in material passing into chamber 51 being drawn into duct 28 and being projected through discharge conduit 56 by the combined air blasts of blowers 22 and 35 whereby the material may be conveyed to any desired location.

In operation, assuming the engine 47 to be operating and the blowers 22 and 35 to be projecting an air blast through discharge conduit 56 and creating a vacuum in hopper 14, the inlet conduit 16 is disposed in the supply of granular or fluent material to be conveyed at which time such material will flow therethrough and into the upper portion of hopper 14. Upon reaching the upper portion of hopper 14 the velocity of the material will immediately be reduced and consequently this material will fall by gravity to the bottom of the hopper. Upon reaching the bottom of the hopper 14 the material will flow by gravity and the vacuum induced in chamber 51 through the outlet and into the chamber 51 whereupon the blast of air in duct 28 will draw the material from chamber 51 into the duct, this action being augmented by the air blast from blower 35 flowing through the duct 53 and joining duct 28 at 54, the material flowing through duct 28 being projected through the discharge conduit 56 by the combined effect of the air blasts.

It will thus be seen that in no case will any of the conveyed material pass through either of the blowers 22 or 35 and that there are no valves, dampers, or other obstructions in the path of flow of such material from the source to the point of discharge.

The apparatus described above may be constructed of relatively inexpensive structural metal parts, the blowers 22 and 35 and the internal combustion engine 47 being readily available items, the remainder of the apparatus constituting merely a relatively simple fabrication problem. It has been found that many types of fluent or granular material may be conveyed over relatively long distances by the apparatus described above and even though foreign bodies may be present therein clogging or stoppage of the apparatus is substantially absent unless, of course, such foreign bodies are larger than the passages provided, but in any event, there are no obstructions in the path of flow of the material to impede such flow.

It will be obvious to those skilled in the art that various changes may be made in the invention without departing from the spirit and scope thereof and this invention is not limited therefore by that which is shown in the drawings or described in the specification but only as indicated in the appended claims.

What is claimed is:

1. A portable pneumatic conveyor for fluent material comprising a frame, a hopper mounted on said frame and having a material inlet adjacent the upper end thereof, first and second blowers mounted on said frame, power means mounted on said frame for driving said blowers, a conduit connecting the inlet of said first blower to said hopper adjacent the upper end thereof to provide a partial vacuum within said hopper whereby fluent material is drawn through said material inlet into said hopper, a material receiving chamber disposed below said hopper and communicating therewith whereby material will flow by gravity from said hopper to said chamber, an outlet from said chamber, first and second air discharge ducts connected to said first and second blowers, said first duct communicating with said outlet whereby flow of air in said first duct induces a partial vacuum in said chamber to move material from said chamber into said first duct, a material discharge conduit connected to said first duct, said second duct communicating with said first duct at a point remote from said outlet whereby the air flow from said first and second blowers will combine to propel material through said discharge conduit.

2. A portable pneumatic conveyor for fluent material comprising a frame, a hopper mounted on said frame and having a material inlet adjacent the upper end thereof, first and second blowers mounted on said frame, a conduit connecting the inlet of said first blower to said hopper adjacent the upper end thereof to provide a partial vacuum within said hopper whereby fluent material is drawn through said material inlet into said hopper, a material receiving chamber disposed below said hopper and communicating therewith whereby material will flow by gravity from said hopper to said chamber, an outlet from said chamber, first and second air discharge ducts connected to said first and second blowers, said first duct communicating with said outlet whereby flow of air in said first duct induces a partial vacuum in said chamber to move material from said chamber into said first duct, a material discharge conduit connected to said first duct, said second duct communicating with said first duct at a point remote from said outlet whereby the air flow from said first and second blowers will combine to propel material through said discharge conduit.

3. A pneumatic conveyor system for fluent material comprising a closed hopper having a discharge opening at the bottom and an inlet at the top, a closed chamber beneath the hopper and in communication therewith through said discharge opening, said closed chamber having an outlet for the discharge of fluent material, said chamber having a generally horizontal bottom wall serving to limit the flow of fluent material from said hopper, a conduit extending past the outlet from said chamber, a blower having its inlet in communication with said hopper for maintaining a vacuum to draw fluent material into said hopper through said inlet at the top and having its discharge in communication with said conduit whereby a partial vacuum will be produced in said hopper and chamber and fluent material will be moved from said chamber through said conduit, a second blower having its discharge connected to said conduit at a location spaced from the outlet of said chamber in the direction of movement of the fluent material whereby both blowers will serve to urge the fluent material in the same direction.

4. A pneumatic conveyor system for fluent material comprising a closed hopper having a discharge opening at the bottom and an inlet at the top, a closed chamber beneath the hopper and in communication therewith through said discharge opening, said closed chamber having an outlet for the discharge of fluent material, said chamber having a generally horizontal bottom wall serving to limit the flow of fluent material from said hopper, a conduit extending past the outlet from said chamber, a blower having its inlet in communication with said hopper and having its discharge in communication with said conduit whereby a partial vacuum will be produced in said hopper to draw fluent material through said hopper inlet and into said hopper, the discharge of said blower producing a partial vacuum in said chamber for causing fluent material to be moved from said chamber through said conduit, a second blower having its discharge connected to said conduit at a location spaced from the outlet of said chamber in the direction of movement of the fluent material whereby both blowers will serve to urge the fluent material in the same direction.

References Cited in the file of this patent

UNITED STATES PATENTS

| Number | Name | Date |
|---|---|---|
| 240,265 | Palmer | Apr. 19, 1881 |
| 827,502 | Campbell | July 31, 1906 |
| 1,173,073 | Williams | Feb. 22, 1916 |
| 1,512,322 | Wallace | Oct. 21, 1924 |
| 1,852,535 | Moore | Apr. 5, 1932 |
| 2,272,564 | Kuever | Feb. 10, 1942 |